(12) United States Patent
Schmitt et al.

(10) Patent No.: US 12,275,339 B2
(45) Date of Patent: Apr. 15, 2025

(54) MOUNT FOR MOTOR-VEHICLE HEADREST

(71) Applicant: GRAMMER AG, Ursensollen (DE)

(72) Inventors: Sebastian Schmitt, Nuremberg (DE); Stefan Bergler, Neurnarkt (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/849,822

(22) Filed: Sep. 26, 2022

(65) Prior Publication Data

US 2023/0031120 A1 Feb. 2, 2023

(30) Foreign Application Priority Data

Jul. 28, 2021 (DE) .......................... 102021119619.1

(51) Int. Cl.
*B60N 2/812* (2018.01)
*B60N 2/818* (2018.01)
*B60N 2/80* (2018.01)

(52) U.S. Cl.
CPC ............. *B60N 2/812* (2018.02); *B60N 2/818* (2018.02); *B60N 2002/899* (2018.02)

(58) Field of Classification Search
None
See application file for complete search history.

(56) References Cited

U.S. PATENT DOCUMENTS

| | | | |
|---|---|---|---|
| 7,121,626 B2 * | 10/2006 | Akehi | B60N 2/818 297/410 |
| 9,132,470 B2 * | 9/2015 | Pausch | B60N 2/818 |
| 9,346,383 B2 * | 5/2016 | Martin | B60N 2/4249 |
| 10,391,908 B2 | 8/2019 | Hans | |
| 2006/0214492 A1 * | 9/2006 | Hassler | B60N 2/815 297/410 |
| 2017/0088024 A1 * | 3/2017 | Hans | B60N 2/809 |
| 2022/0169162 A1 * | 6/2022 | Hoffmann | B60N 2/815 |

* cited by examiner

*Primary Examiner* — David E Allred
(74) *Attorney, Agent, or Firm* — LUCAS & MERCANTI, LLP; Klaus P. Stoffel

(57) ABSTRACT

Among other things, the invention relates to a mounting assembly for a headrest with at least one mounting rod (13*a*, 13*b*) having at least one retaining structure (17) that can be mounted on a vehicle seat by at least one mounting assembly (19*a*, 19*b*) having a respective seat (14), wherein the seat (14) forms a passage (25) for supporting and guiding the mounting rod (13*a*, 13*b*), wherein the mounting assembly (19*a*, 19*b*) has a latch assembly (15) that releasably latches the mounting rod (13*a*, 13*b*) can be releasably latched in at least one position relative to the seat (14), wherein the latch assembly (15) has at least one latch element (16) that is movable between a latching position and a release position and has a latch formation (21) that can be releasably engaged with at least one retaining structure (22) of the mounting rod (13*a*, 13*b*) to prevent movement of the mounting rod in at least one direction ($p_1$, $p_2$) along the passage (25).

The particularity is that the latch formation (21) has at least one mating surface (32, 33) that cooperates with a driving surface (34, 35) of the retaining structure (17) in such a way that when rotating the mounting rod (13*a*) about a longitudinal central axis (m) relative to at least one rotational direction ($u_1$, $u_2$), in particular relative to two opposite rotational directions ($u_1$, $u_2$), the latch element (16) is entrained.

16 Claims, 7 Drawing Sheets

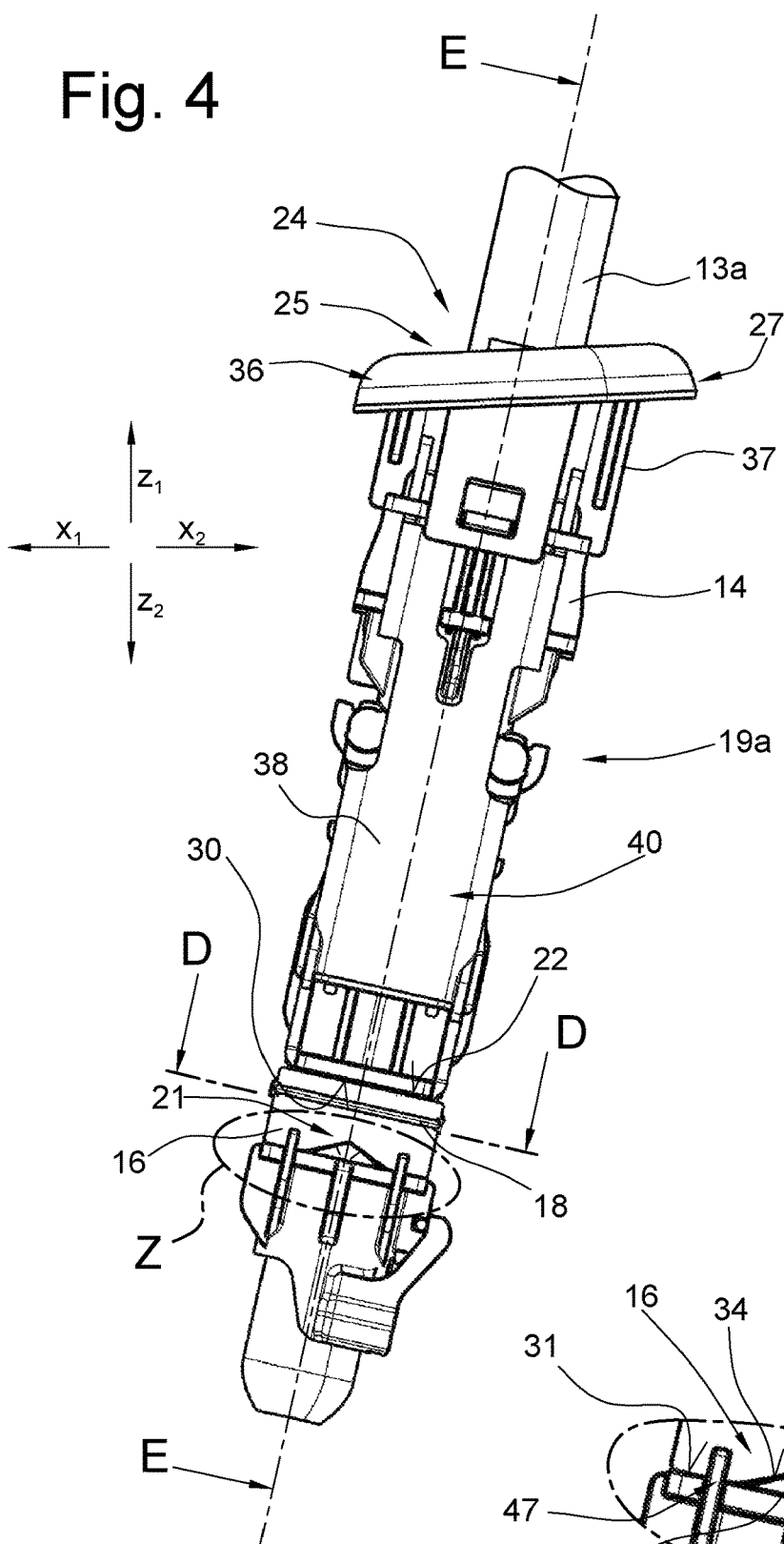
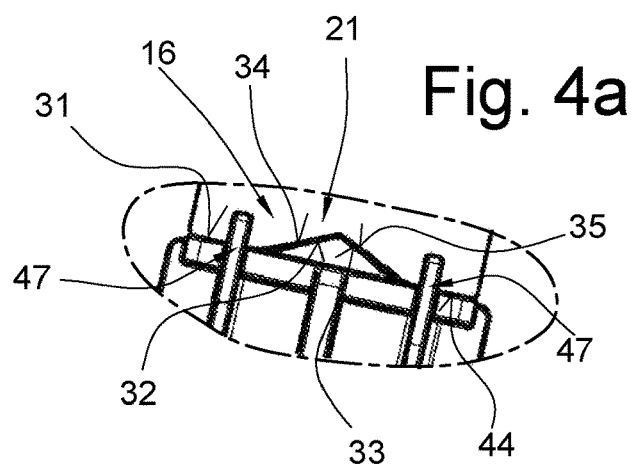
Fig. 4
Fig. 4a

Fig. 8
Fig. 9
Fig. 10
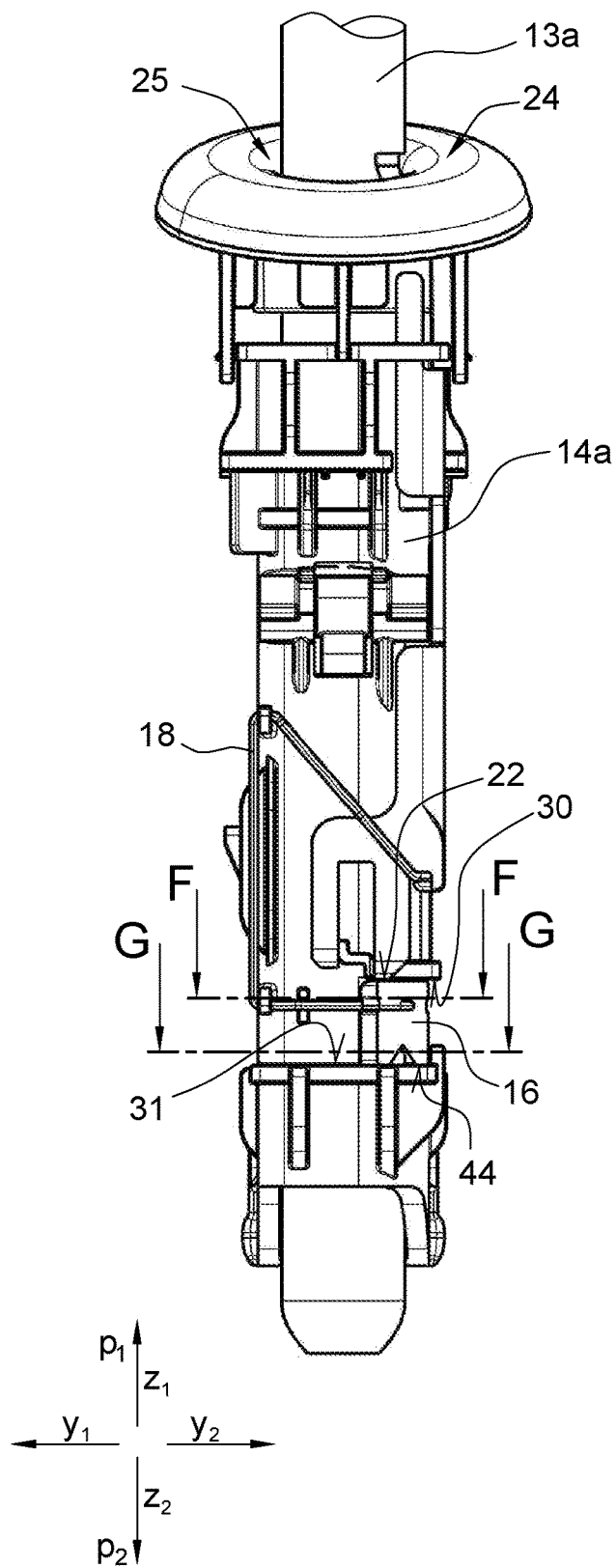
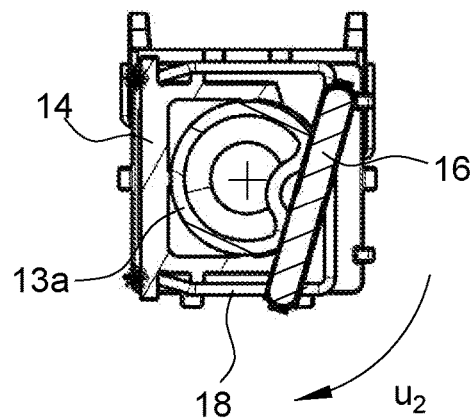
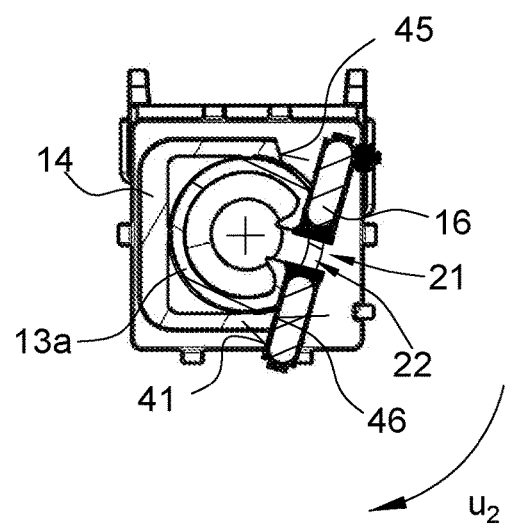

MOUNT FOR MOTOR-VEHICLE HEADREST

FIELD OF THE INVENTION

According to a first aspect, the invention relates to a mounting assembly.

BACKGROUND OF THE INVENTION

Such mounting assemblies are known from obvious prior use. A head part of a headrest is mounted on the backrest of a vehicle seat with two mounting rods. Mounting assemblies are fastened to the vehicle structure of the vehicle seat, which mounting assemblies serve to support and guide the mounting rods. Each of the support rods has a plurality of latch notches, for example, wherein a latch assembly of the mounting assembly cooperates with one of the latch notches to lock the mounting rod in a position. Due to extraordinarily high forces, caused by a vehicle impact, for example, the problem often arose that the support rod was rotated relative to its longitudinal central axis. Due to the rotation, the latch assembly lost engagement with the latch formation of the support rod when it was provided on only one side of the support rod.

To resolve this problem, a measure is known in which the notch was formed all the way around the mounting rod. According to an alternative, the notch was formed over a large circumferential area of the mounting rod.

DE 10 2015 012 411 [U.S. Pat. No. 10,391,908] relates to a headrest with a latch, wherein it is proposed to design the latch movably, so that it rotated with the rotation of the mounting rod.

OBJECT OF THE INVENTION

It IS the object of the invention to provide a mounting assembly that is easy to produce and nevertheless exhibits a high level of functional reliability, in particular with rotation of the mounting rod about the longitudinal axis.

SUMMARY OF THE INVENTION

The mounting assembly according to the invention is provided for a headrest, in particular for a headrest for a vehicle seat. The headrest has at least one mounting rod. The term mounting rod is also used here to refer to at least one free end of a mounting rod bracket. For example, the headrest has two mounting rods or free ends of a mounting rod bracket.

The mounting rod can be mounted on a vehicle seat with a mounting assembly having at least one seat. The mounting assembly can additionally have a panel part, for example, forming a collar intended to cover the edge of an opening in the upholstery. The mounting assembly forms a passage for supporting and guiding the mounting rod. The mounting rod can be inserted into the passage and held therein. The seat can be fastened to a vehicle seat, for example, in particular to the backrest of a vehicle seat. For example, it can be fastened to the structure of the backrest.

In the context of the invention, passage is to be understood in such a way that a guide is formed that enables movement of the mounting rod in two opposite movement directions as well as mounting. A closed wall is not essential to the invention. The passage can be formed by a guide with only small surface supports that guide the mounting rod in such a way that the mounting rod only has degrees of freedom in two opposite movement directions.

A latch assembly can secure the mounting rod in at least one position relative to the seat. The latch assembly has at least one movable latch element associated with the seat. The latch element has a latch formation that can be releasably engaged with at least one retaining structure of the mounting rod. The latch element is held on the seat in such a way that it can transmit forces to the seat. The seat, for example, is held on the vehicle seat in such a way that it can transmit forces to the vehicle seat.

The latch assembly is movable between a latching position and a release position, wherein in the latching position the latch element is engaged with the retaining structure and in the release position the latch element is disengaged from the retaining structure. In the latching position, the mounting rod cannot be moved in the directions of degrees of freedom of the passage. These are, for example, opposite directions on a movement path defined by the passage. In the latching position, forces can be transmitted between at least one retaining surface of the retaining structure and a latch surface of the latch element.

At least one latch surface of the latch element cooperates with at least one support surface, for example, of the seat to transfer forces from the latch assembly to the seat in the latching position. The latch surface cooperates with the seat to absorb forces acting in the direction of the degrees of freedom of the passage from the mounting rod and transfer them to the seat. For example, side areas of the latch surfaces cooperate with the seat.

The at least one mating surface of the latch element can transmit forces from the at least one driving surface of the mounting rod to the latch element in the direction of rotation about the central axis of the mounting rod. The seat is designed in such a way that, even after rotation of the latch element following the mounting rod, forces can be transmitted from the mounting rod via the latch assembly to the seat in such a way that the latch assembly of the mounting rod is not released in the latching position. For this purpose, the seat has the support surfaces that are designed in such a way that they can also absorb forces when the latch element is rotated.

The mounting rod has at least one retaining structure. The retaining structure has at least one retaining surface that cooperates with the latch surface of the latch element. For example, two opposite retaining surfaces are provided that cooperate with two latch surfaces to prevent the mounting rod from moving in opposite directions.

In addition, the retaining structure has at least one driving surface that cooperates with a mating surface of the latch formation. In particular, two driving surfaces are formed, each of which cooperates with a mating surface to ensure that the latch element is driven when the mounting rod is rotated in opposite directions. The cooperating surfaces, i.e. the driving surface and the counter surface, are arranged in such a way that when the mounting rod is rotated about a longitudinal central axis of the passage of the seat, the latch element is entrained. The latch element is entrained when the mounting rod is rotated by driving surfaces that can transmit forces acting in the rotational direction between the mounting rod and the latch element.

The advantage of the inventive features of the invention is that unintentional release of the latch assembly from the latching position is prevented due to the latch element being entrained when the mounting rod is rotated about a longitudinal central axis. The latch element is rotated along due to the cooperating surfaces and thus the engagement of the latch element and retaining structure remains. In other words, even after a joint rotation of the mounting rod and the latch, the support rod cannot move in the direction of the latched degree of freedom. The solution according to the invention also has the advantage that it has low manufacturing cost.

The latch formation and/or the retaining structure have a rectangular shape, a V-shape, a U-shape or a semicircular shape, for example, and the latch formation has a complementary shape. Ultimately, however, any conceivable shape can be used that prevents relative movement of the latch element and the latch formation when the support axis is rotated about the central axis. This can also be achieved, for example, by free-forming contours.

The latch element can be movable into engagement with the latch formation in any conceivable manner. For example, the latch element is moved approximately radially to the mounting rod between the latching position and the release position. If the latch element is mounted on one side of a retaining element, for example, it is pivoted along a circular path. In this case, the movement also contains non-radial movement components.

For example, the latch element is of plate-shaped design, i.e. its thickness is low in relation to its height and width. At least one latch surface and at least one mating surface can thus be formed on the latch element.

For example, the mounting assembly has an actuator for actuating the latch. For example, the latch element cooperates with an actuating element. For example, the actuating element can move the latch element between the latching position and the release position. For example, the actuating element can be a slider and can be actuated with a control element that can be controlled from the outside on the headrest or the vehicle seat.

The latch element is movably guided on the seat between the latching position and the release position, e.g. by guide surfaces, e.g. by a guide link. In this way, the latch element is always held in the correct position as it moves between the latching position and the release position. In addition, forces acting on the latch element can be absorbed by the guide structures of the guide link. The guide surfaces are formed, for example, by the support surfaces mentioned in the application.

The guide of the latch element can have stop surfaces that define the latching position in such a way that the latch element cannot come into contact with a bottom surface of the retaining structure extending substantially parallel to the longitudinal central axis of the mounting rod. The stop surfaces can be formed on the seat. In this way, adjustment noises are prevented and wear on the mounting rod and the latch element remain low.

Additionally or alternatively to the features mentioned in the above paragraph, the guide can have stop surfaces that limit the movement of the latch element into the release position.

For example, the latch element can be rotatably mounted about one or alternatively two axes. For example, the latch element can be rotatably held on the seat about a first axis parallel to the longitudinal central axis of the support rod. In this way, it can follow rotation of the mounting rod to a certain extent, so that the engagement of the latch element with the retaining structure is not lost.

Additionally or alternatively, the latch element may be rotatably mounted about an approximately horizontal axis that assists in rapid latching when the latch assembly is moved into the latching position.

For example, the latch element is mounted on a support. For example, the support is movable relative to the guide device, in particular to the seat. Additionally, for example, the latch element is movable relative to the support. For example, the latch element is rotatably held on the support about at least one axis. For example, the latch element is held on the support rotatably about two axes. The support can be an arm, for example. The arm is elastically deformable, for example.

For example, side areas of the latch element cooperate with opposing support surfaces of the seat. In this way, forces transmitted from the mounting rod to the latch element with respect to two opposite directions can be absorbed by the seat.

For example, the seat is formed from a guide sleeve. For example, the guide sleeve can be fastened on the backrest structure.

According to a second aspect, the invention relates to a headrest. The headrest has a head part with a head support surface and a retaining device for supporting the head part on a vehicle seat, in particular on the backrest of the vehicle seat. In addition, the headrest has at least one mounting assembly for supporting at least one mounting rod or at least one free end of a mounting rod bracket of the retaining device on the vehicle seat.

Such a headrest is known from the prior art already mentioned with respect to the first aspect of the invention.

It was the object of the invention to provide a headrest that is easy to provide and nevertheless exhibits a high level of functional reliability in particular with rotation of the mounting rod about the longitudinal axis.

The object is achieved by a headrest according to the features of the invention.

The headrest is intended for a seat, in particular a vehicle seat. It has a head part and a retaining device having at least one mounting rod. At least one mounting rod has at least one retaining structure. In addition, the headrest has a mounting assembly for guiding and supporting the mounting rod. A mounting rod has a movable latch element that is associated with the mounting assembly, wherein the latch element is in engagement with the retaining structure in a latching position and is disengaged from the retaining structure in a release position.

The mounting assembly is designed according to the first aspect of the invention. The retaining structure has at least one driving surface that cooperates with the mating surface of the latch element in such a way that, when rotating the mounting rod about the longitudinal central axis (m) relative to at least one rotational direction, the latch element is entrained.

With respect to the advantages of the headrest, in order to avoid repetition, reference is made to the explanations regarding the first aspect of the invention.

The latch formation and the retaining structure have at least areas, for example that can be releasably engaged in a form-fitting manner.

The retaining structure and the latch formation are complementary, for example.

The retaining device has two mounting rods, for example, or two free end areas of a mounting rod bracket. Free end areas are also referred to in this application as mounting rods.

At least one mounting rod is provided with an arrangement of at least one retaining structure. An arrangement means that one or a plurality of retaining structures is arranged in such a way that the latch element can move into engagement with each individual structure. For example, one or a plurality of retaining structures is parallel to the longitudinal axis of the mounting rod. Subsequently, only one retaining structure can then be provided that holds the support rod in the seat of the backrest. Alternatively, at least two retaining structures could be provided so that the mounting rod can be locked into different relative positions to the seat.

Each of the arrangements of retaining structures is associated with a latch, for example. In this way, secure latching can be ensured. If, for example, two mounting rods are each provided with an assembly, each assembly is part of the latch, for example.

Embodiments of the invention are described by way of example in the following description of the figures and with reference to the drawings. For the sake of clarity, identical or comparable parts or elements or areas are designated with the same reference characters, sometimes with the addition of lowercase letters, even where different embodiments are concerned.

Features described with respect to only one embodiment may be provided within the scope of the invention with respect to any other embodiment of the invention. Such amended embodiments—even if not shown in the drawings—are included in the invention.

All disclosed features are per se essential to the invention. The disclosure of the application hereby also includes the disclosure content of the corresponding priority documents (submission of the prior application) and of the cited publications and the described prior art devices in their entirety, also for the purpose of including individual or several features of these documents in one or several claims of the present application.

BRIEF DESCRIPTION OF THE DRAWING

In the figures:

FIG. 4 is a section along line C in FIG. 3, FIG. 4a is a large-scale view of a detail of FIG. 4, FIG. 8 is, like FIG. 2, a sectional view of the headrest, where rotation of the mounting rod and the latch element relative to the seat has taken place, FIG. 9 is a section along line F-F in FIG. 8, FIG. 10 is a section along line G—G in FIG. 8.

SPECIFIC DESCRIPTION OF THE INVENTION

In the figures, the vertical directions are denoted by $z_1$ and $z_2$, the horizontal directions parallel to a sagittal axis of a seat occupant are denoted by $x_1$ and $x_2$, and the horizontal directions parallel to a front axis are denoted by $y_1$ and $y_2$. Due to the inclined position of the backrest of vehicle seat, the directions $p_1$ and $p_2$ may differ from the directions $z_1$ and $z_2$.

Figure 1:
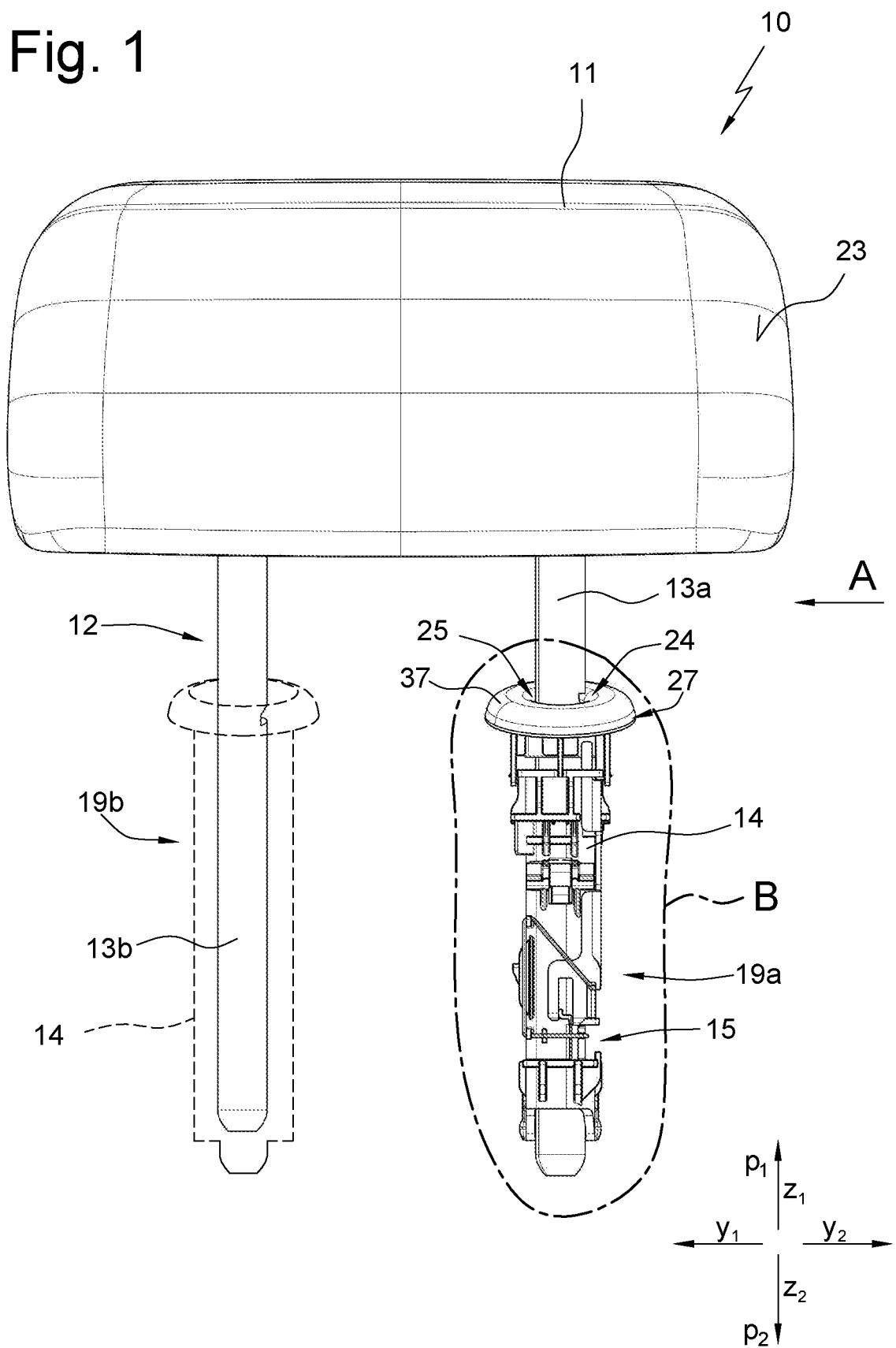
FIG. 1 is a front view of the headrest with head support part, retaining device and mounting assemblies, where only one of the two mounting assemblies is shown.

FIG. 1 shows a headrest that is denoted as a whole with reference character 10. The headrest 10 has a head part 11 with a head support surface 23, a retaining device 12 with mounting rods 13a and 13b and mounting assemblies 19a and 19b for supporting the mounting rods 13a and 13b on a vehicle seat (not shown). Only the mounting assembly 19a is shown in the figures, while the mounting assembly 19b is merely indicated using dashed lines.

The mounting assemblies 19a and 19b can be fastened to a structure of the vehicle seat. The mounting assemblies 19a and 19b each have an insertion opening 24 that merges into a passage 25. The respective mounting rod 13a or 13b can be inserted into the passage 25 in the direction $p_2$ via the insertion opening 24. The passage 25 limits the degrees of freedom of the mounting rods 13a and 13b in such a way that they are only movable in the directions $p_1$ and $p_2$ when the respective mounting rod 13a and 13b is in the passage 25. Each mounting assembly 19a and 19b has a seat 14 and a panel part 37.

As the mounting assemblies 19a and 19b are configured the same, in the following only the mounting assembly 19a is described.

Figure 2:
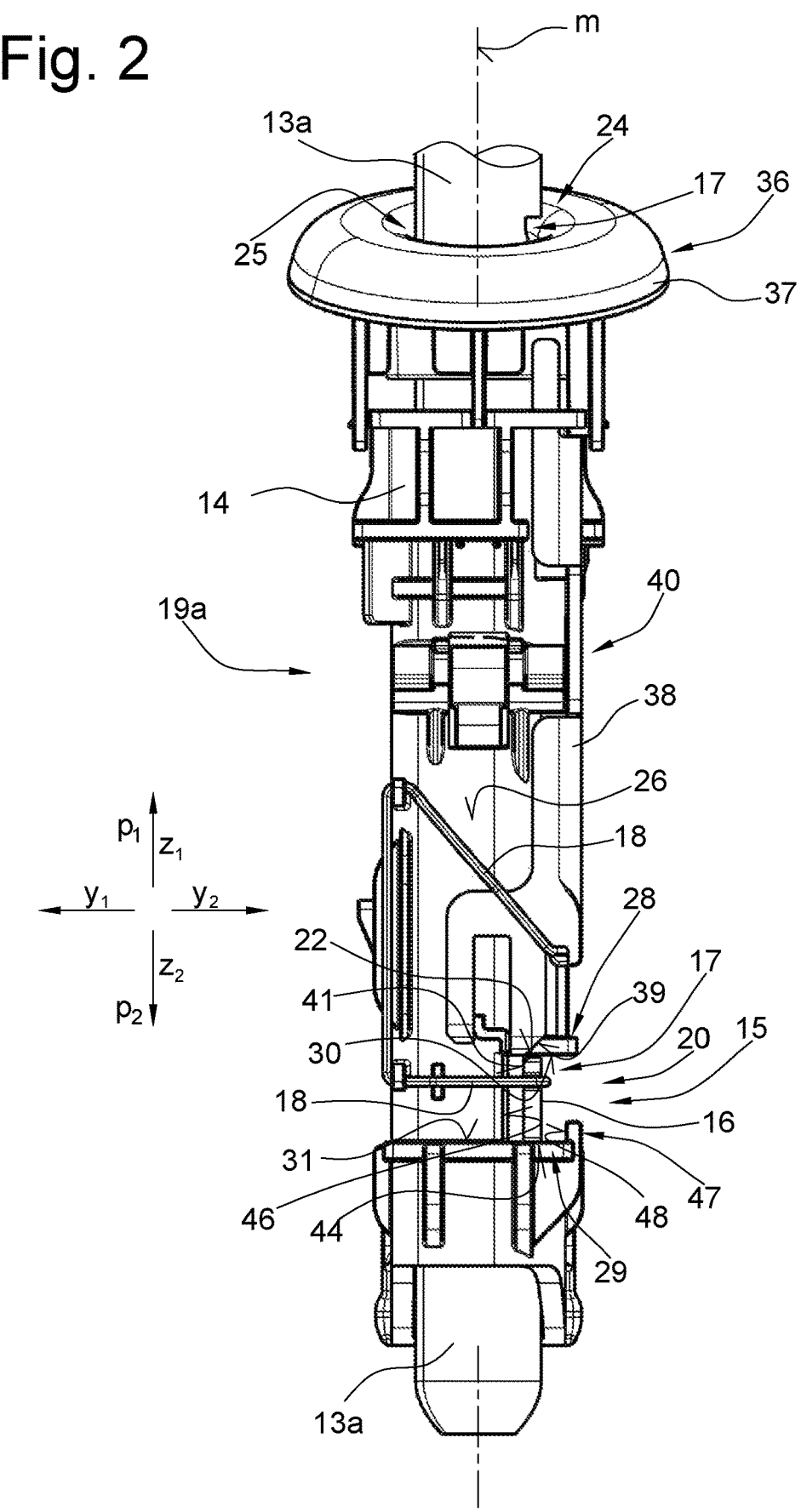
FIG. 2 is a section along line B in FIG. 1.

The insertion opening 24 is configured by the panel part 37 that, in the present embodiment, forms an annular collar 27 intended to engage over the upholstery of the vehicle seat. A lower area of the mounting assembly 19a (see FIG. 2) is formed by the seat 14. The wall of the seat 14 has an opening 20. Web structures 28 and 29 are formed on the opening 20 at spaced intervals with respect to a longitudinal central axis m of the seat 14 and the mounting rod 13a, wherein the web structure 28 forms a support surface 30 and the web structure 29 forms a support surface 31. The function of the support surfaces 30 and 31 is explained below.

A latch assembly 15 (see FIG. 2) is movable between a latching position and a release position to releasably latch the movement of the mounting rod 13a relative to the seat 14. In the present embodiment, the latch assembly 15 is shown only with respect to the seat 14 of the guide device 14a, but it is provided on both mounting assemblies 19a and 19b, and each latch assembly 15 cooperates with one of the mounting rods 13a and 13b.

In this embodiment, the latch assembly 15 is a safeguard that prevents the mounting rods 13a and 13b from moving out of the mounting assemblies 19a and 19b in the direction $p_1$ or from moving in the opposite direction $p_2$. Alternatively or additionally, however, the latch assembly 15 could also be a height adjustment element for adjusting the mounting rods 13a and 13b in the directions $p_1$ and $p_2$ relative to the respective seat 14 or in the context of a horizontal adjustment element for adjusting and latching a head support part that can be adjusted relative to a base part in the directions $x_1$ and $x_2$.

The latching device 15 has a latch element 16 held on the seat 14 that is movable in the directions $y_1$ and $y_2$. The latch assembly 15 further has at least one retaining structure 17 of the mounting rod 13a, in this area two retaining structures 17, with which the latch element 16 is releasably in engagement in the latching position (see FIG. 2). The latch element 16 is loaded in the latching position by a spring 18.

In the latching position, the latch element 16 is in engagement with the retaining structure 17 of the mounting rod 13a, and in the release position, the latch element 16 is disengaged from the retaining structure 17. In the latching position, the mounting rod 13a cannot be moved in the directions $p_1$ and $p_2$. In the release position, movement in the directions $p_1$ and $p_2$ is possible. In FIGS. 1 to 6, the latch element 16 is in the latching position and in FIG. 7 the latch element 16 is in the release position.

Alternatively, however, the retaining structure 17 could also be designed such that in the latching position movement in the direction $p_2$ is possible, but movement in the direction $p_1$ is prevented.

In the area of the latch element 16, the seat 14 has the opening 20 that enables the latch element 16 to be moved between the latching position and the release position and the spring 18 that is mounted on an outer surface 26 of the seat 14, to load the latch element 16 into the latching position in the direction $y_1$.

The latch element 16 is plate-shaped, i.e. its thickness is low in relation to its height and width. A guide moveably guides the latch element 16 between the latching position and the release position.

In the latching position, latch surfaces 22 and 44 of the latch element 16 prevent movement of the mounting rod 13a in the directions $p_1$ and $p_2$ relative to the seat 14a. The latch surface 22 cooperates with a first retaining surface of the retaining structure 17 and with the support surface 30. In addition, the latch surface 44 cooperates with a second retaining surface of the retaining structure 17 and with the support surface 31. In this way, forces acting in the directions $p_1$ and $p_2$ can be transmitted from the mounting rod 13a to the seat 14.

Actuator 40 movable between an unactuated position and an actuated position moves the latch assembly 15 between the latching position and the release position. According to FIG. 2, the actuator 40 has an operating part 36 with which a user can operate the actuator 40 from outside of the vehicle seat. In the present example, the operating part 36 is formed from the panel part 37. Alternatively, however, it could also be formed as a separate part. The operating part 36 cooperates with an actuating element 38. The actuating element 38 is guided on the seat 14a so as to be movable in the directions $p_1$ and $p_2$. When actuating the operating part 36 in the direction $p_2$, the actuating element 38 is adjusted in the direction $p_2$ by the control part.

With movement of the actuating element 38 in the direction $p_2$, the latch element 16 is moved from the latching position into the release position. The movement of the latch element 16 in the direction $y_2$ is carried out via an actuating surface 39 of the actuating element 38 that cooperates with an outer surface 41 of the latch element 16 facing the mounting rod 13a. A limit of the movement of the latch in the direction $y_2$ is formed by two pins 47, each providing a limiting surface 48.

In the present embodiment, the actuating surface 39 is inclined to the movement direction of the actuating element 38 and forms a movement converter with the outer surface 41 of the latch element 16 that is slanted in a complimentary manner in this area. The movement converter converts forces acting in the direction $p_2$ into forces acting in the direction $y_2$. The direction $y_2$ is oriented approximately at right angles to the direction $p_2$. In this way, the latch element 16 can be moved against the force of the spring 18 from the latching position into the release position from the engagement with the retaining structure 17.

If the operating part 36 is unloaded, the spring 18 moves the latch element 16 again in the direction $y_1$ into the latching position.

In the present embodiment, the spring 18 is formed by an elastically deformable band, e.g. made of rubber, or a plastic, e.g. a silicone that loads the latch element 16 into the latching position and loads the actuating element 38 and thus, due to the movement connection, the actuator 40 into the unactuated position. Alternatively, two separate springs could also be provided, wherein one loads the latch and the other loads the actuating element 38. The at least one spring could also be formed from another material, e.g. as a metal spring.

Figure 3:
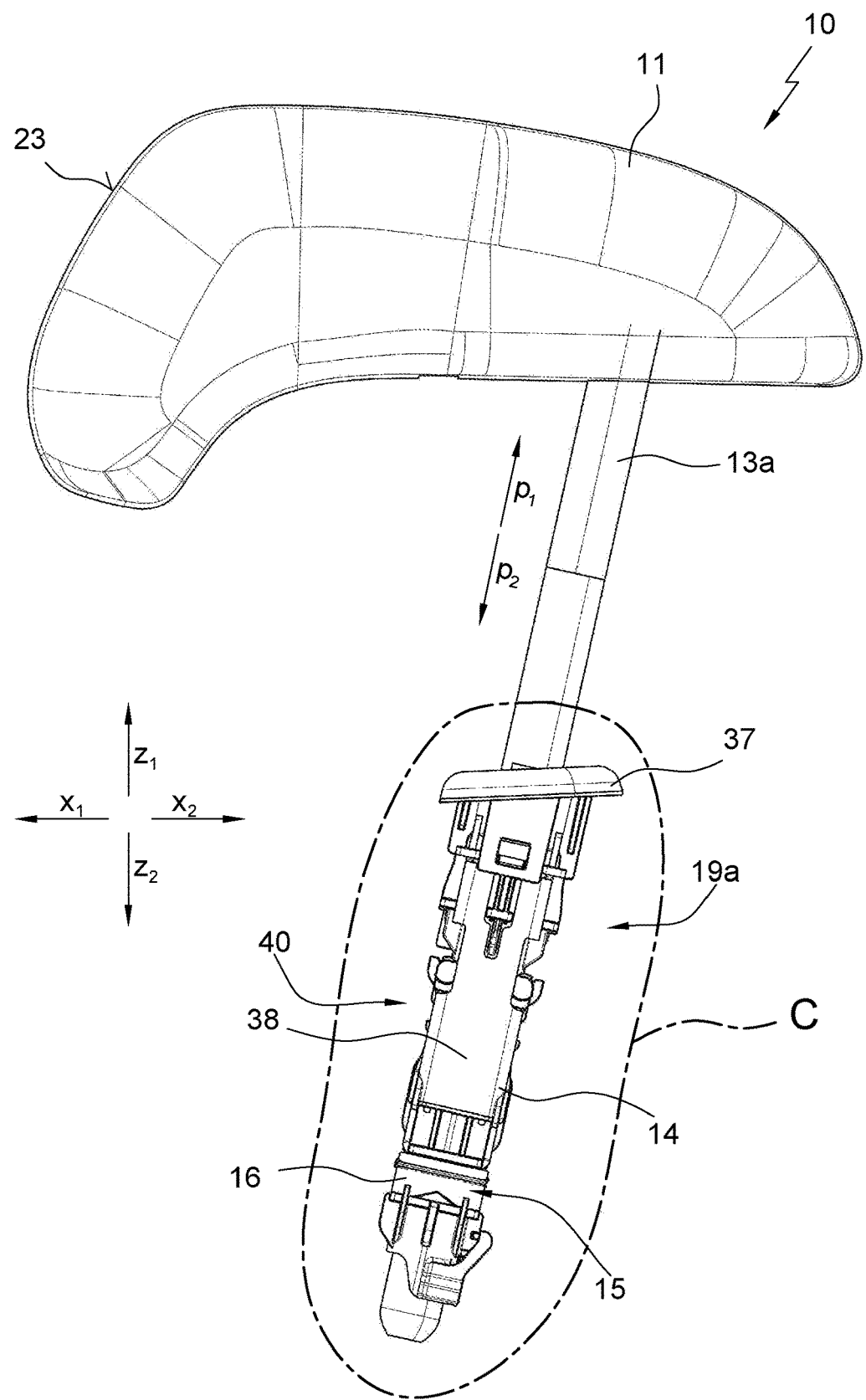
FIG. 3 is a side view in the direction of arrow A in FIG. 1.

As can be seen in FIGS. 3, 4 and 4a, the latch element 16 has a latch formation 21 that cooperates with the retaining structure 17. The latch formation 21 provides mating surfaces 32 and 33. The retaining structure 17 has driving surfaces 34 and 35, wherein the driving surface 34 cooperates with the mating surface 32 and the driving surface 35 cooperates with the mating surface 33. The driving surfaces 34 and 35 and the mating surfaces 32 and 33 form an acute angle, a right angle or an obtuse angle, for example.

The latch formation 21 of the latch element 16 is able to absorb forces transmitted from the retaining structure 17 to the latch element 16 when the mounting rod 13a is rotated in the rotational directions $u_1$ and $u_2$ (see FIG. 5) about the central axis m. Forces can be transmitted to the mating surfaces 32 and 33 via the driving surfaces 34 and 35 when the mounting rod 13a rotates in both rotational directions, so that the latch element 16 moves along in the rotational direction of the mounting rod 13a.

Figure 5:
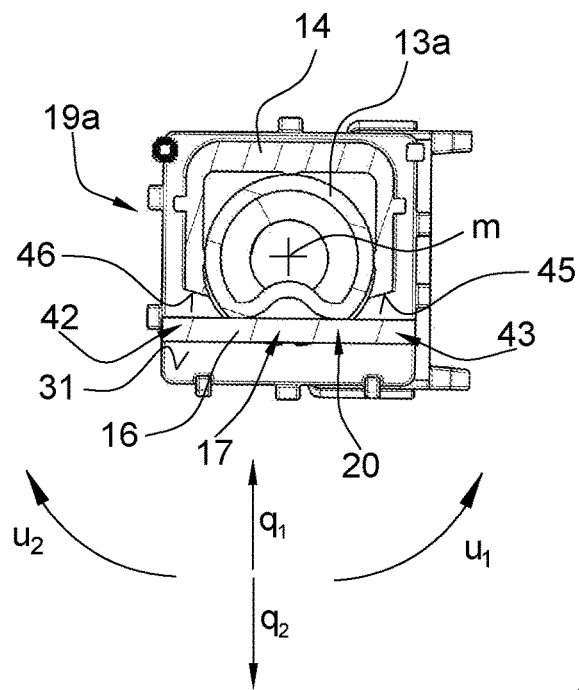
FIG. 5 is a section line D-D in FIG. 4.

In this way, the latch element 16 is prevented from disengaging from the retaining structure 17 and the mounting rod 13a is no longer securely held to the vehicle seat. As explained above, the latch element 16 continues to transmit forces to the seat 14 after rotation that forces act in the direction $p_1$ or $p_2$ from the mounting rod 13a to the latch element 16. In FIG. 5, stop surfaces 45 and 46 of the seat 14 can be seen, against which the latch element 16 can strike during a maximum rotation in one of the directions $u_1$ or $u_2$.

In the present embodiment, the driving surfaces 34 and 35 and the mating surfaces 32 and 33 are each approximately V-shaped and complementary to one another. However, other shapes can also be used that prevent the mounting rods 13 from rotating. A rectangular shape, a U-shape or a semicircular shape transmits forces acting in the rotational direction from the mounting rod 13a to the latch element 16. The latch formation 21 must be designed in such a way that forces acting in the aforementioned directions can be transmitted from the mounting rod 13a to the latch element 16. In addition, the movement of the latch element 16 between the latching position and the release position should be easy to perform.

FIGS. 4, 4a, 5 and 6 show the latch element 16 in the latching position. Movement of the mounting rod 13a in the directions $p_1$ or $p_2$ is not possible. The mounting rod 13a is in an unrotated position.

FIG. 5 shows a cross-section to the longitudinal axis m and shows the mounting rod 13a, the seat 14 and the latch element 16 in the latching position. It can be seen that the latch element 16 engages in a central area in the retaining structure 17 and projects beyond it with side areas 42 and 43, so that it can bear against the surfaces 30 and 31 of the seat 14 to transmit forces to the seat 14 acting in the directions $p_1$ and $p_2$.

Figure 6:
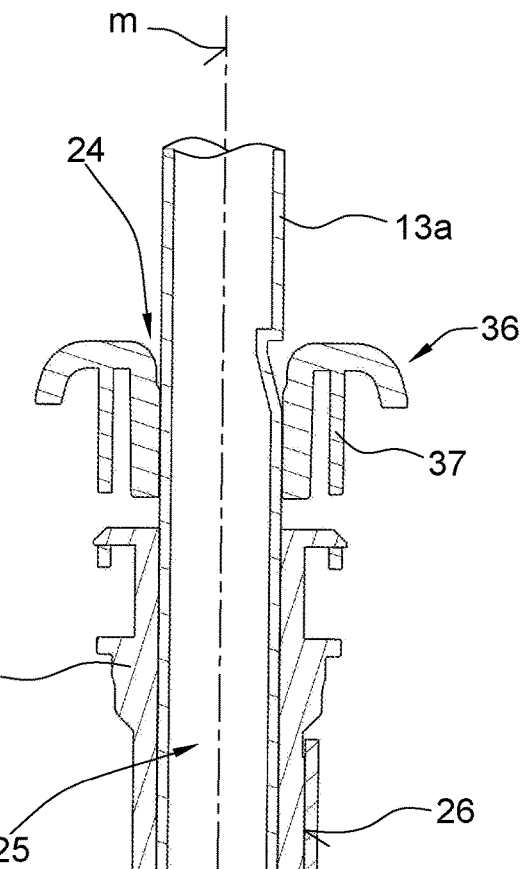
FIG. 6 is section line E-E in FIG. 4, where the latch assembly is in the latching position.
Figure 6:
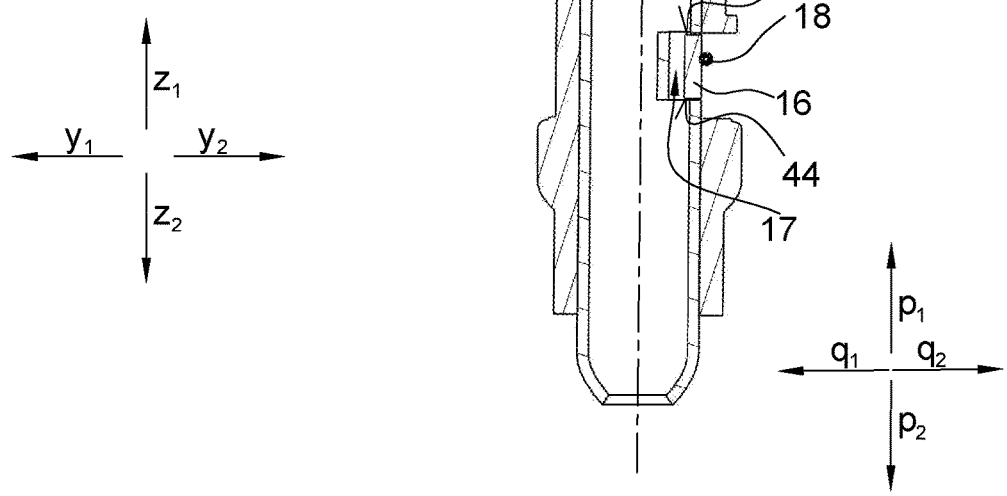

The longitudinal section parallel to the longitudinal axis m shows the latch element 16 according to FIG. 6 in the latching position in engagement with the mounting rod structure 17. Forces acting in the directions $p_1$ or $p_2$, which are transmitted from the mounting rod 13a to the latch element 16, are deflected from the latch element 16 to the support surfaces 30 and 31 in the latching position.

Figure 7:
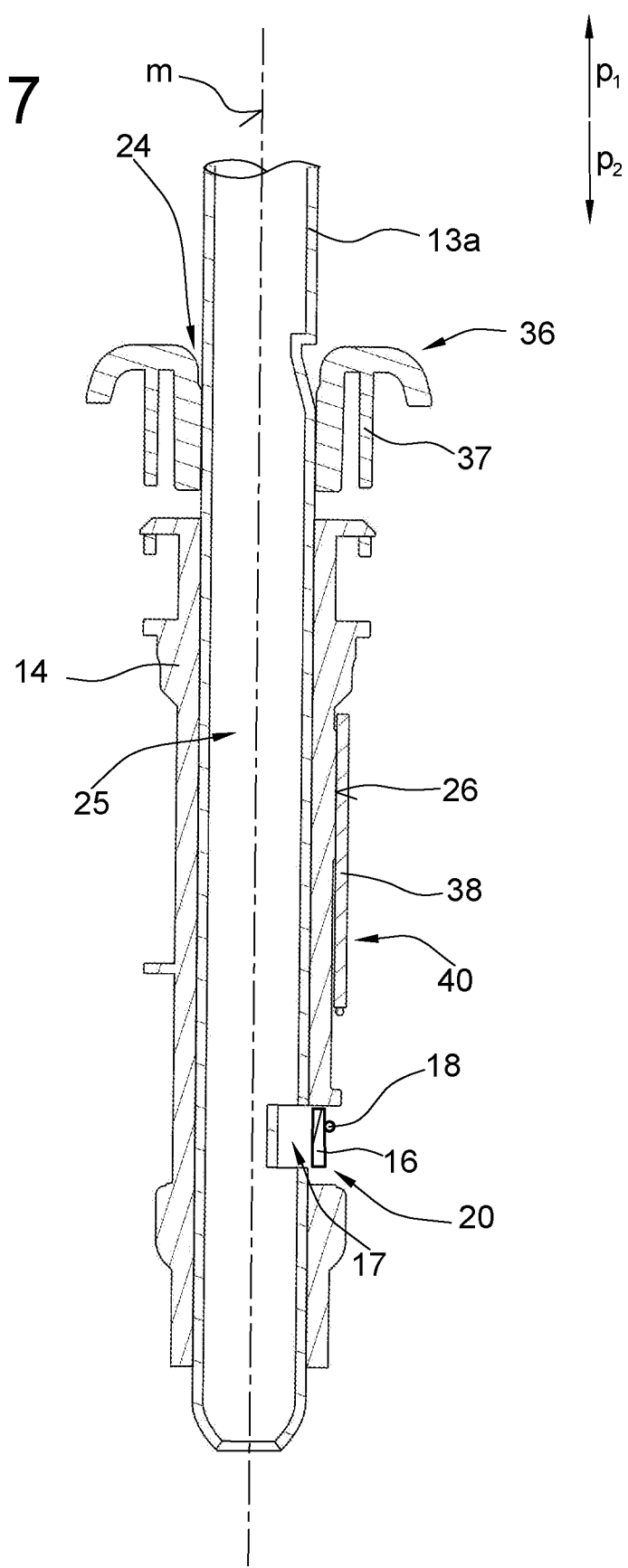
FIG. 7 is a section like FIG. 6, where the latch assembly is in the release position.

In FIG. 7, the latch element 16 is moved into the release position and is disengaged from the mounting rod structure 17. The mounting rod 13a can be moved in the directions $p_1$ and $p_2$.

FIGS. 8 to 10 show a mounting rod 13a rotated in the direction $u_2$ relative to the seat 14a. The latch element 16 is on the stop surface 46. FIGS. 9 and 10 show that the latch element 16 has been entrained by the mounting rod 13a in the direction $u_2$ due to the driving surface 34 and continues to be in engagement with the mounting rod structure 17 in the latching position. In addition, the latch element 16 also cooperates with the support surfaces 30 and 31 in the rotated position. It thus prevents movement in the directions $p_1$ and $p_2$.

The invention claimed is:

1. A mounting assembly for a headrest that has a mounting rod having a longitudinal center axis and a retaining structure, the mounting assembly comprising:
   a seat forming a passage for supporting and guiding the mounting rod for movement in a movement direction in a motor vehicle seat back along the passage and having a support surface; and
   a latch that releasably latches the mounting rod in a position relative to the seat and that has a latch element movable between a latching position and a release position and that in turn has a latch formation configured to be releasably engaged with the retaining structure of the mounting rod to prevent the movement of the mounting rod in the movement direction in the passage, the latch formation having a mating surface that in the latching position engages an entrainment surface of the retaining structure, the entrainment surface transmitting rotational forces to the mating surface of the latch element such that, when the mounting rod rotates about the longitudinal center axis relative to opposite rotational directions, the latch element is entrained and, after rotation of the latch element by the mounting rod, forces in the movement direction in the passage are transmitted from the mounting rod via the latch element to the support surface of the seat so that the latch element is not released from the latching position, wherein the latch has a latch surface and the retaining structure has a retaining surface that prevent the movement of the mounting rod in the latching position relative to the seat, wherein the entrainment surface and the mating surface are separate at least in position from the latch surface and the retaining surface.

2. The mounting assembly according to claim 1, wherein an area of the latch formation has a rectangular shape, a V-shape, a U-shape or a semicircular shape.

3. The mounting assembly according to claim 1, wherein the latch element is movable approximately radially to the axis.

4. The mounting assembly according to claim 1, wherein the latch element is plate-shaped and has a thickness that is smaller than a length or width of the latch element.

5. The mounting assembly according to claim 1, wherein the latch element cooperates with an actuating element such that the latch element is movable by the actuating element between the latching position and the release position.

6. The mounting assembly according to claim 1, wherein the latch element has guide surfaces with which the latch element is movably guided between the latching position and the release position.

7. The mounting assembly according to claim 6, wherein the latch element has stop surfaces for the latching position such that the latch element cannot contact a bottom surface of the retaining structure.

8. The mounting assembly according to claim 1, further comprising a support carrying the latch element.

9. The mounting assembly according to claim 1, wherein side areas of the latch element cooperate with the support surface of the seat.

10. The mounting assembly according to claim 1, wherein the seat is formed by a guide sleeve.

11. A headrest for a vehicle seat, the headrest comprising:
    a head part;
    a retaining device; and
    a mounting assembly according to claim 1 for guiding and supporting the mounting rod and having the latch assembly having the latch element associated with the mounting assembly and the retaining structure, the latch element engaging the retaining structure in the latching position and being disengaged from the retaining structure in the release position, the mounting assembly having the latch formation, the retaining structure having a driving surface that cooperates with the mating surface of the latch element.

12. The headrest according to claim 11, wherein the retaining structure and the latch formation cooperate in a form-fitting manner.

13. The headrest according to claim 11, wherein the retaining structure and the latch formation are at least partially complementary.

14. The headrest according to claim 11, wherein the retaining structure has two mounting rods including the mounting rod, or two free end areas on the mounting rod.

15. The headrest according to claim 11, wherein a free end area of the mounting rod has the retaining structure.

16. The headrest according to claim 15, wherein there is more than one retaining structure and and more than one latch element, each retaining structure is associated with a respective one of the latch elements.

* * * * *